UNITED STATES PATENT OFFICE.

WILHELM MATT, OF NEW YORK, N. Y.

PLASTIC COMPOUND FOR USE IN THE DECORATIVE ARTS, &c.

SPECIFICATION forming part of Letters Patent No. 366,967, dated July 19, 1887.

Application filed December 11, 1886. Serial No. 221,313. (No specimens.)

*To all whom it may concern:*

Be it known that I, WILHELM MATT, a subject of the Emperor of Germany, residing in the city, county, and State of New York, have invented a new and useful Plastic Compound for use in the Decorative Arts and other Purposes, which I designate as "Petra-Crustra Matt;" and I do hereby declare that the following is a full and exact description thereof.

My invention relates to the manufacture of a plastic compound adapted to serve as a covering for walls and for the production of all manner of molded objects of a useful and ornamental character.

The object of my invention is to produce at a low cost a fire and water proof composition specially designed for use in all manner and styles of artistic decorative work which shall present a hard finished surface, will admit of being molded or stamped in all manner of forms, as well as of being produced in continuous sheets having a plain or ornamental surface either in relief or intaglio, and which may be painted, colored, or gilded by the use of any description of paints, dyes, or coloring-matters without affecting or altering the same. This object is obtained by the admixture, according to my invention, of the following ingredients in substantially the manner and proportions hereinafter set forth: I take of commercial gelatine ten pounds, and dissolve it in about thirty pounds of water, to which, by preference, there has been added four pounds of alcohol. Where the alcohol is used, the process of dissolving the gelatine is preferably carried on in a close steam-tight vessel by the aid of heat. I take, also, of dried raw untanned depilated animal skins, by preference rabbit skins, which have been cut into fine bits or strips, or reduced to shreds, and, placing them in about thirty pounds of hot water, thoroughly cook and digest them in a steam-kettle until the water is evaporated therefrom and they are left in a soft gelatinous mass. The reduced skins are then added to the hot solution of gelatine and thoroughly stirred therein, the solution being kept hot and well agitated in a steam kettle or digester. To this hot solution of gelatine and reduced skins are added about two pounds of Venetian turpentine, two pounds of linseed-oil, and six pounds of rosin or equivalent gum, and the mixture is then brought to the boiling-point and kept at this temperature while being thoroughly stirred and agitated until all the foam and froth which will arise therefrom settles and disappears and the ingredients are fully combined and admixed, care being taken to prevent the boiling mass from running over during the operation.

When the foregoing compound is properly prepared, I add thereto twenty pounds of paper-pulp and beat up or whip the mixture by means of dashers or revolving arms or other well known appliances for the purpose until the whole is reduced to a slimy mass of uniform consistency, and, finally, I add to this viscid mass sufficient pulverized alabaster or marble-dust or equivalent pulverulent mineral matter to bring it to about the consistency of soft putty, the thorough admixture and incorporation of the pulverulent substance in the mass being produced by kneading it and working it as dough with the hands or by means of any known mechanical devices for the purpose. The plastic composition thus obtained may then be laid in a thin coat upon a sheet or web of fibrous material or textile fabric and carried between two metallic compressing-rollers, one or both of which are either plain or engraved or embossed with any desired pattern, which will operate to firmly unite the composition to the fibrous web, or it may be molded in suitable molds into useful and ornamental figures and shapes of all varieties.

When formed in plain sheets, the sheets may be placed under dies which shall operate by pressure thereon to emboss the surface with any desired pattern. The sheets, plates, or objects thus formed of the plastic composition are finally allowed to dry and harden, and will then be both water-proof and fire-proof. The hardening process is usually completed under ordinary atmospheric influences within twenty-four hours.

The new product is admirably adapted as a covering for walls in the place of paper, and its application to the purposes of decorative art and for architectural effects admits of infinite variety and modification.

The proportions given of the respective ingredients are those which have been found to best effect the end in view; but they admit of being varied with good results.

I contemplate the use of cotton-seed oil and other vegetable oils as an equivalent for linseed-oil.

I claim as my invention—

1. The within-described plastic compound, consisting of a solution of water, gelatine, digested animal skins, turpentine, linseed-oil, and rosin, in about the proportions set forth, thickened by the addition thereto of paper-pulp in substantially the proportion given, and reduced to a plastic state by the addition of pulverulent mineral matter, all substantially in the manner and for the purpose herein set forth.

2. The within-described plastic compound of water, gelatine, digested animal skins, turpentine, linseed-oil, rosin, paper-pulp, and marble-dust, in combination with a foundation of textile material, substantially in the manner and for the purpose herein set forth.

In testimony whereof I have signed my name to this specification in the presence of two subscribing witnesses.

WILHELM MATT.

Witnesses:
HERMANN JONAS,
DANIEL R. GARDEN.